United States Patent
Kuo

(10) Patent No.: US 10,625,955 B2
(45) Date of Patent: Apr. 21, 2020

(54) ELECTRIC VACUUM SUCTION LIFTER

(71) Applicant: TKT CORPORATION, Keelung (TW)

(72) Inventor: Ping-Yuan Kuo, New Taipei (TW)

(73) Assignee: TKT CORPORATION, Keelung (TW)

( * ) Notice: Subject to any disclaimer, the term of this patent is extended or adjusted under 35 U.S.C. 154(b) by 0 days.

(21) Appl. No.: 16/436,063

(22) Filed: Jun. 10, 2019

(65) Prior Publication Data

US 2019/0375604 A1  Dec. 12, 2019

(30) Foreign Application Priority Data

Jun. 11, 2018  (TW) .............................. 107120039 A

(51) Int. Cl.
*B65G 49/06* (2006.01)
*B65G 47/91* (2006.01)

(52) U.S. Cl.
CPC ........... *B65G 49/061* (2013.01); *B65G 47/91* (2013.01); *B65G 2249/04* (2013.01)

(58) Field of Classification Search
CPC ................ B25J 15/0683; B25J 15/0691; B25J 15/0616; B25B 11/007; B29D 11/0024; B66C 1/02; B66C 1/0293; B66F 9/181; B65G 49/061; B65G 47/91; B65G 2249/04

USPC ......................................................... 294/189
See application file for complete search history.

(56) References Cited

FOREIGN PATENT DOCUMENTS

| DE | 4314999 A1 | * | 11/1994 | ............. B65G 47/91 |
|----|------------|---|---------|------------------------|
| EP | 0493979 A1 | * | 7/1992 | ........... B66C 1/0212 |
| EP | 0590554 A1 | * | 4/1994 | ........... B66C 1/0212 |
| WO | WO-8803110 A1 | * | 5/1988 | ................ B63C 7/22 |
| WO | WO-0066481 A1 | * | 11/2000 | |

* cited by examiner

*Primary Examiner* — Stephen A Vu
(74) *Attorney, Agent, or Firm* — Li & Cai Intellectual Property (USA) Office

(57) ABSTRACT

A touch display device includes a display module, a touch module and a light-transmitting substrate. The display module has a display surface and a bottom surface opposite to the display surface. The touch module is fixed to the display surface by an adhesive. The adhesive, the touch module and the display surface together form an accommodating space between the display module and the touch module. The light-transmitting substrate is disposed in the accommodating space, one side of the light-transmitting substrate is fixed to the display surface by a first optical adhesive, the other side of the light-transmitting substrate is fixed to the touch module by a second optical adhesive. An adhesive strength of the adhesive is greater than an adhesive strength of the first optical adhesive, and the adhesive strength of the adhesive is greater than an adhesive strength of the second optical adhesive.

21 Claims, 15 Drawing Sheets

ELECTRIC VACUUM SUCTION LIFTER

CROSS-REFERENCE TO RELATED PATENT APPLICATION

This application claims the benefit of priority to Taiwan Patent Application No. 107120039, filed on Jun. 11, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a suction lifter, and more particularly to an electric vacuum suction lifter.

BACKGROUND OF THE DISCLOSURE

Generally, when carrying large piece of glass, the technical personnel will use a manual suction lifter to adsorb the glass and then carry the glass by a handle of the manual suction lifter. However, in the process of carrying the glass, the suction strength of the suction lifter could somehow become weaker. If the technical personnel do not timely readjust the suction strength of the suction lifter, the suction lifter will detach from the glass, which causes unexpected danger.

The aforesaid manual suction lifter is also widely used in aloft work. For example, the technical personnel will use the manual suction lifter to adsorb the glass or an exterior wall of a building, and then connect the manual suction lifter and a suspended cage (e.g. a crane basket) by a connecting rope. The manual suction lifter and the connecting rope are the safety measurement for the suspended cage and for the technical personnel carried by the suspended cage. Similarly, the suction strength of the suction lifter could somehow become weaker. As mentioned above, if the technical personnel do not timely readjust the suction strength of the suction lifter, the suction lifter will detach from the glass, which causes unexpected danger.

Therefore, an improved suction lifter according to the present application is provided to solve the abovementioned problems.

SUMMARY OF THE DISCLOSURE

In response to the above-referenced technical inadequacies, the present disclosure provides a touch display device and a display device.

In one aspect, the present disclosure provides an electric vacuum suction lifter operable to be sucked on a surface. The electric vacuum suction lifter includes a main body, a control unit, a vacuum pump, a pressure sensing unit, a battery unit, a start button and a pressure relief button. The main body has a suction surface in one side of the main body, wherein: the suction surface is configured with a first annular sealing unit and a second annular sealing unit thereon; one side of the first annular sealing unit which is distal from the suction surface is defined as a first adhering surface; the second annular sealing unit is disposed in a first opening of the first annular sealing unit; one side of the second annular sealing unit which is distal from the suction surface is defined as a second adhering surface; a distance between the second adhering surface and the suction surface is greater than a distance between the first adhering surface and the suction surface; and the second annular sealing unit, the suction surface and the surface together form a sealed space when the second adhering surface of the second annular sealing unit is adhered to the surface. The control unit is disposed on the main body. The vacuum pump is disposed on the main body, wherein: the vacuum pump is electrically connected to the control unit; the vacuum pump is controlled by the control unit to draw the air inside the sealed space to the exterior of the main body. The pressure sensing unit is disposed on the main body, wherein the pressure sensing unit measures a pressure of the sealed space to generate instant pressure information. The battery unit is disposed on the main body, wherein: the battery unit is electrically connected to the control unit; the battery unit provides electric power for operation of the control unit, the vacuum pump and the pressure sensing unit; and wherein an external power equipment charges the battery unit. The start button is disposed on the main body, wherein: the start button is electrically connected to the control unit; and the control unit controls operation of the vacuum pump when the start button is pressed. The pressure relief button is disposed on the main body, wherein the air drawn to the exterior of the main body enters into the sealed space through the main body when the pressure relief button is pressed. When the second adhering surface is adhered to the surface and the control unit controls the operation of the vacuum pump to draw the air inside the sealed space to the exterior of the main body, the control unit determines whether the pressure of the sealed space is greater than a high predetermined pressure based on the instant pressure information. When the control unit determines that the pressure of the sealed space is greater than or equal to the high predetermined pressure, the control unit controls the vacuum pump to terminate the operation. When the control unit controls the vacuum pump to terminate the operation, the pressure sensing unit continuously measures the pressure of the sealed space, and the control unit continuously determines whether the pressure of the sealed space is smaller than a low predetermined pressure based on the instant pressure information. When the control unit determines that the pressure of the sealed space is smaller than the low predetermined pressure, the control unit controls the operation of the vacuum pump. A negative pressure value corresponding to the high predetermined pressure is greater than a negative pressure value corresponding to the low predetermined pressure.

In certain embodiments, the present disclosure provides an electric vacuum suction lifter, wherein: a hardness of the first annular sealing unit is greater than a hardness of the second annular sealing unit; when the second annular sealing unit is adhered to the surface and the control unit controls the operation of the vacuum pump to draw the air inside the sealed space, the second annular sealing unit deforms with a shape of the surface to tightly adhere on the surface; the main body is further configured with at least one handle; and, when the electric vacuum suction lifter is sucked on the surface of a member, the member can be carried via the handle.

In one aspect, the present disclosure provides an electric vacuum suction lifter operable to be sucked on a surface.

The electric vacuum suction lifter includes a main body, a control unit, vacuum pump, a pressure sensing unit, a battery unit, a start button, and a pressure relief button. The main body has a suction surface in one side of the main body, wherein: the suction surface is configured with a first annular sealing unit and a second annular sealing unit thereon; one side of the first annular sealing unit which is distal from the suction surface is defined as a first adhering surface; the second annular sealing unit is disposed in a first opening of the first annular sealing unit; one side of the second annular sealing unit which is distal from the suction surface is defined as a second adhering surface; a distance between the second adhering surface and the suction surface is smaller than a distance between the first adhering surface and the suction surface; and the second annular sealing unit, the suction surface and the surface together form a sealed space when the first adhering surface of the first annular sealing unit is adhered to the surface. The control unit is disposed on the main body. The vacuum pump is disposed on the main body, wherein: the vacuum pump is electrically connected to the control unit; the vacuum pump is controlled by the control unit to draw the air inside the sealed space to the exterior of the main body. The pressure sensing unit is disposed on the main body, wherein the pressure sensing unit measures a pressure of the sealed space to generate instant pressure information. The battery unit is disposed on the main body, wherein: the battery unit is electrically connected to the control unit; the battery unit provides electric power for operation of the control unit, the vacuum pump and the pressure sensing unit; and wherein an external power equipment charges the battery unit. The start button is disposed on the main body, wherein: the start button is electrically connected to the control unit; and the control unit controls operation of the vacuum pump when the start button is pressed. The pressure relief button is disposed on the main body, wherein the air drawn to the exterior of the main body enters into the sealed space through the main body when the pressure relief button is pressed. When the first adhering surface is adhered to the surface and the control unit controls the operation of the vacuum pump to draw the air inside the sealed space to the exterior of the main body, the control unit determines whether the pressure of the sealed space is greater than a high predetermined pressure based on the instant pressure information. When the control unit determines that the pressure of the sealed space is greater than or equal to the high predetermined pressure, the control unit controls the vacuum pump to terminate the operation. When the control unit controls the vacuum pump to terminate the operation, the pressure sensing unit continuously measures the pressure of the sealed space, and the control unit continuously determines whether the pressure of the sealed space is smaller than a low predetermined pressure based on the instant pressure information. When the control unit determines that the pressure of the sealed space is smaller than the low predetermined pressure, the control unit controls the operation of the vacuum pump. A negative pressure value corresponding to the high predetermined pressure is greater than a negative pressure value corresponding to the low predetermined pressure.

In certain embodiments, the present disclosure provides an electric vacuum suction lifter, wherein: a hardness of the second annular sealing unit is greater than a hardness of the first annular sealing unit; when the first annular sealing unit is adhered to the surface and the control unit controls the operation of the vacuum pump to draw the air inside the sealed space, the first annular sealing unit deforms with a shape of the surface to tightly adhere on the surface; the main body is further configured with at least one handle; and, when the electric vacuum suction lifter is sucked on the surface of a member, the member can be carried via the handle.

Therefore, by virtue of "disposing the electric vacuum suction lifter on the member to be sucked and enabling the electric vacuum suction lifter to automatically sucked to the member by simply pressing the start button" and "automatically detecting the pressure between the electric vacuum suction lifter and the member and automatically drawing air if the pressure is below the low predetermined pressure" of the electric vacuum suction lifter of the present application, a safety issue of the technical personnel who use the electric vacuum suction lifter can be assured.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
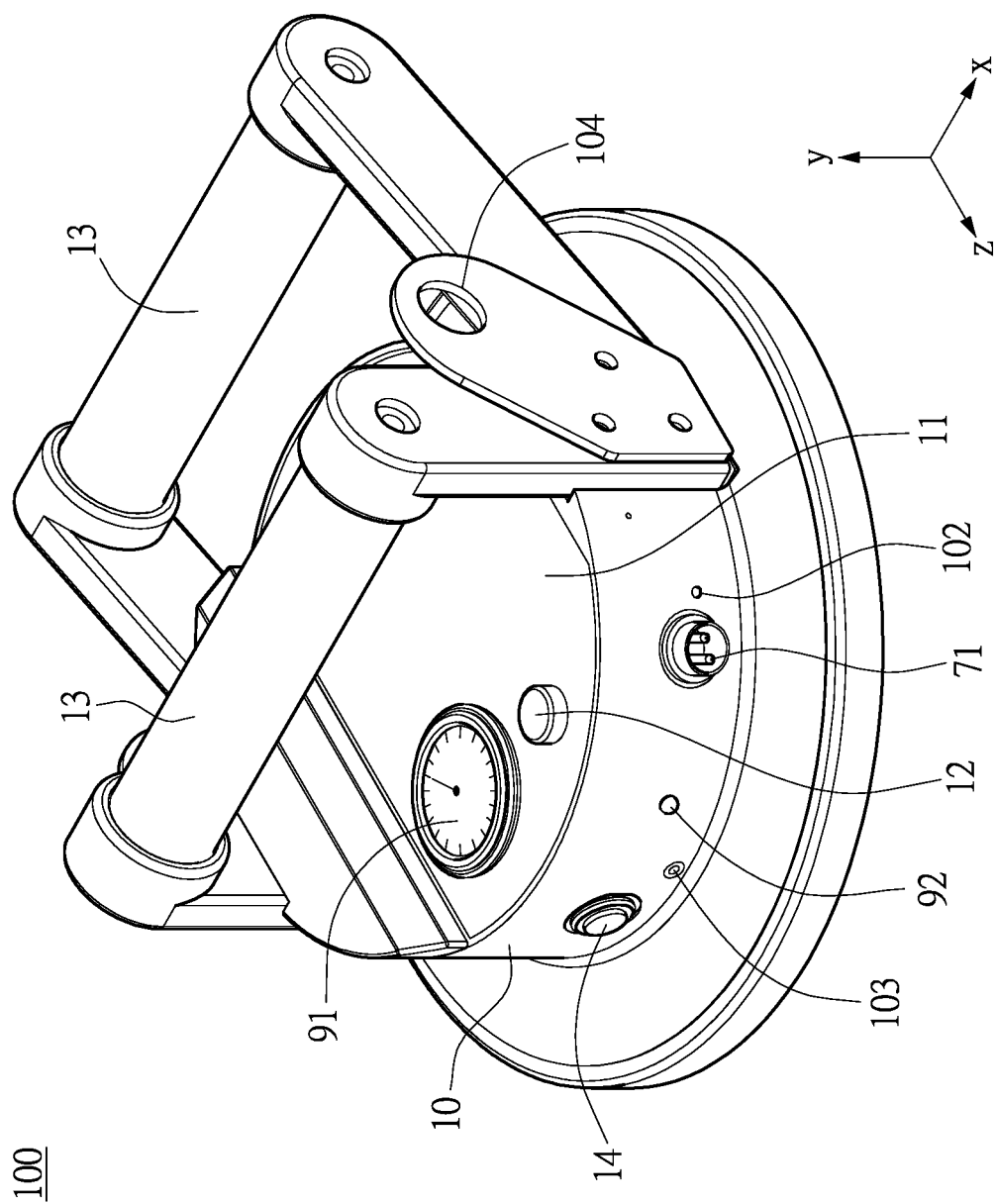
FIG. 1 is a schematic view of a first embodiment of an electric vacuum suction lifter according to the present disclosure.
Figure 2:
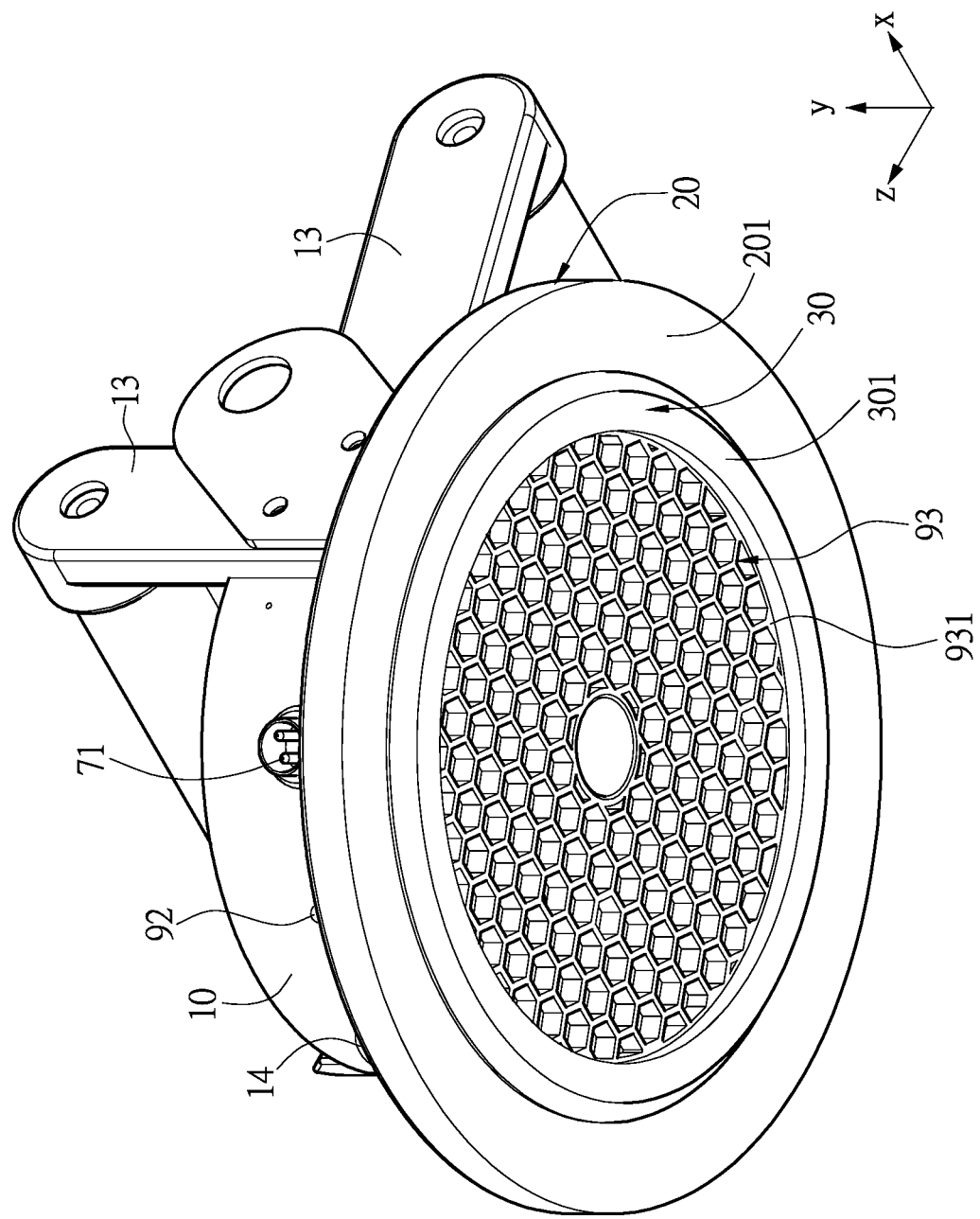
FIG. 2 is a schematic view taken from another perspective of the electric vacuum suction lifter according to the first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 4, an electric vacuum suction lifter 100 at least includes a main body 10, a first annular sealing unit 20, a second annular sealing unit 30, a control unit 40, a vacuum pump 50, a battery unit 60, a charging unit 70, and a pressure sensing unit 80. The control unit 40, the vacuum pump 50, the battery unit 60, the charging unit 70, and the pressure sensing unit 80 are configured to be disposed in the main body 10.

In actual practice, the main body can includes at least a covering body 11. The main body 10 can be formed with an accommodating space (not shown) therein. The covering body 11 can be removably disposed in the main body 10 to selectively seal the accommodating space. Certainly, the main body 10 can exclude the covering body 11 such that the main body 10 will be difficult to be disassembled. The actual shape and size of the main body 10 can be customized and should not be limited to those shown in figures.

Figure 3:
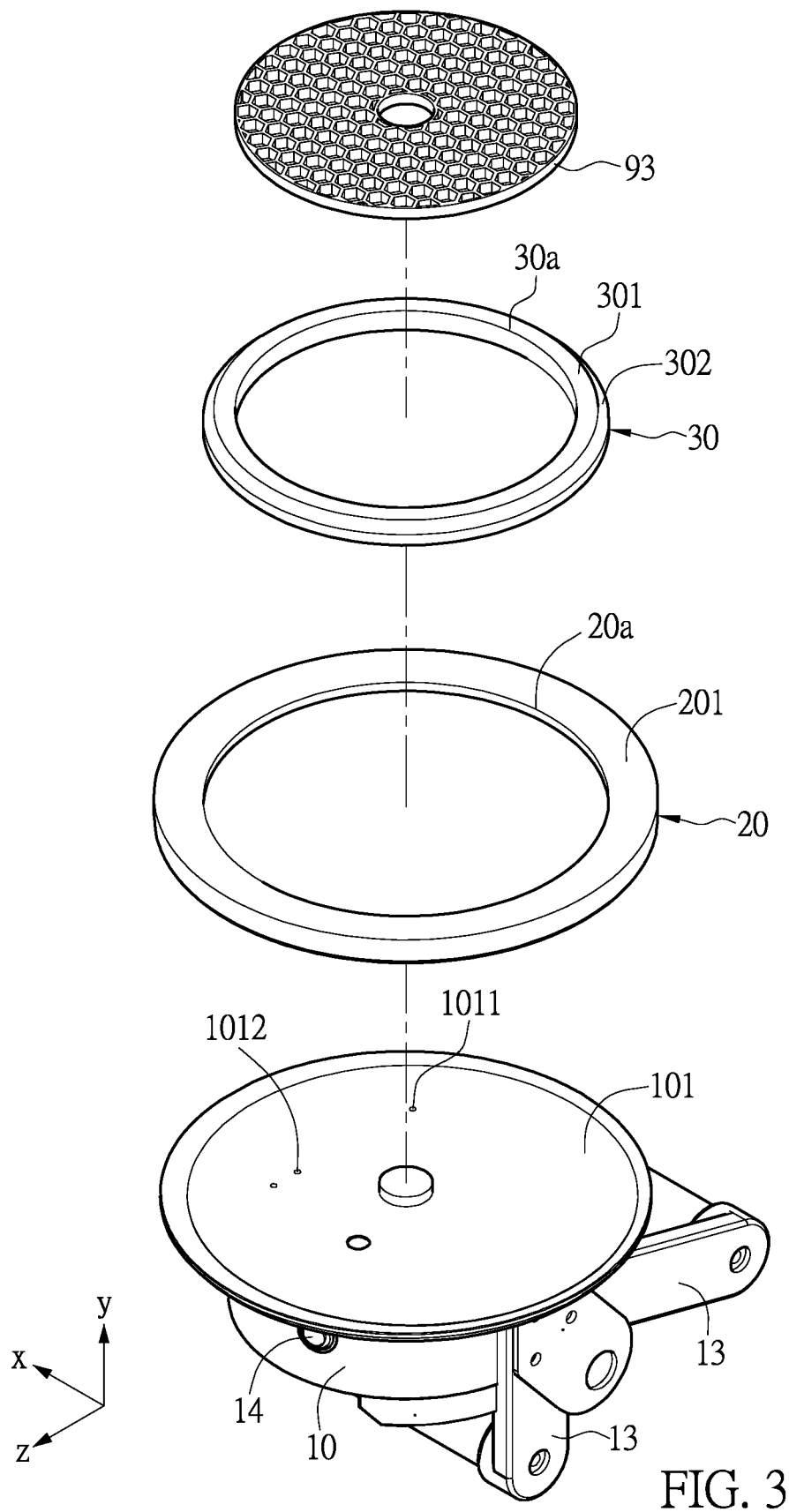
FIG. 3 is an exploded view of the electric vacuum suction lifter according to the present disclosure.

As shown in FIG. 3, the main body 10 has a suction surface 101 in one side of the main body 10. The suction surface 101 is configured with the first annular sealing unit 20 and the second annular sealing unit 30 thereon. In actual practice, the suction surface 101 can be a flat surface. The shape and size of the suction surface 101 can be customized and should not be limited to those shown in figures.

One side of the first annular sealing unit 20 which is distal from the suction surface 101 is defined as a first adhering surface 201. The second annular sealing unit 30 is disposed in a first opening 20a of the first annular sealing unit 20. One side of the second annular sealing unit 30 which is distal from the suction surface 101 is defined as a second adhering surface 301. The first annular sealing unit 20 and the second annular sealing unit 30 of this embodiment are shown in figures to be angular ring-shape, but not limited thereto. In different embodiments, the first annular sealing unit 20 and the second annular sealing unit 30 can also be elliptical ring-shaped or rectangular ring-shaped.

As shown in FIG. 2, FIG. 3, FIG. 5 and FIG. 6, a distance between the second adhering surface 301 and the suction surface 101 is greater than a distance between the first adhering surface 201 and the suction surface 101. In other words, a thickness of the second annular sealing unit 30 is greater than a thickness of the first annular sealing unit 20. A hardness of the second annular sealing unit 30 is smaller than a hardness of the first annular sealing unit 20.

Figure 7:
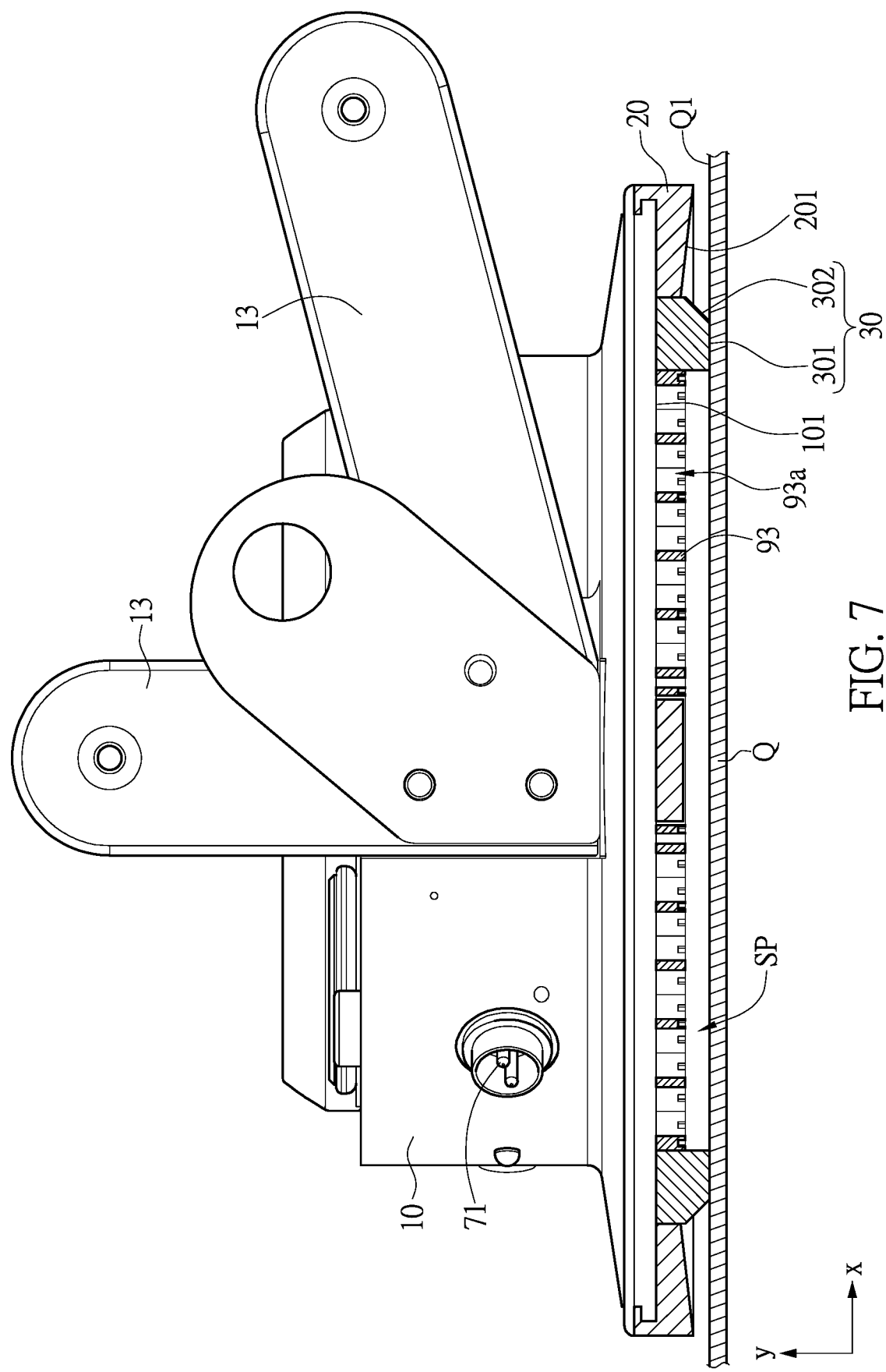
FIG. 7 is a partially cross-sectional view of the electric vacuum suction lifter disposed on a member according to the present disclosure.

As shown in FIG. 7, when the second adhering surface 301 of the second annular sealing unit 30 is adhered to a surface Q1 of a member Q, the second annular sealing unit 30, the suction surface 101 and the surface Q1 together form a sealed space SP. In the meantime, if the start button 12 is pressed by a user, the control unit 40 controls operation of the vacuum pump 50 to draw the air inside the sealed space SP to the exterior of the main body 10, resulting in a negative pressure state between the electric vacuum suction lifter 100 and the member Q. Consequently, the electric vacuum suction lifter 100 is tightly sucked to the surface Q1 of the member Q. Since the operation of the vacuum pump 50 of the present application for drawing the air inside the sealed space SP to the exterior of the main body 10 is substantially the same as the operation of the conventional vacuum pump, the detailed description will thus be omitted. Certainly, the main body 10 must include a necessary structure or component for the vacuum pump 50 to draw the air inside the sealed space SP to the exterior of the main body 10, the detailed description will be omitted for sake of brevity. Specifically, as shown in FIG. 1 and FIG. 3, the main body 10 is formed with an air discharging hole 103, and the suction surface 101 is formed with an air drawing hole 1012. The air discharging hole 103 is in spatial communication with the air drawing hole 1012. Therefore, when the vacuum pump 50 is in operation, the air inside the sealed space SP can be drawn to the exterior of the main body 10 through the air discharging hole 103 and the air drawing hole 1012.

Figure 8:
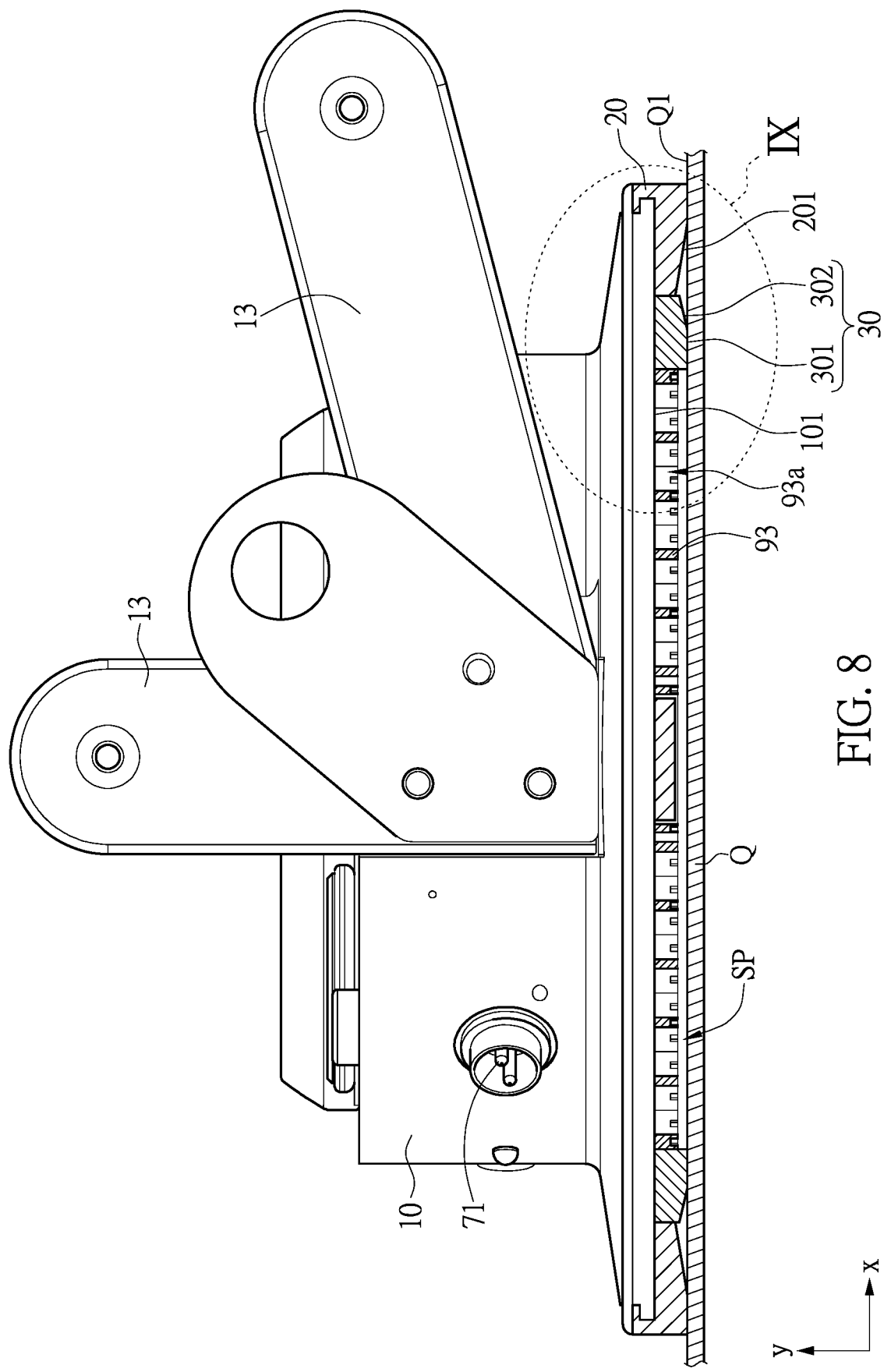
FIG. 8 is a schematic view of the electric vacuum suction lifter sucked on the member according to the present disclosure.
Figure 9:
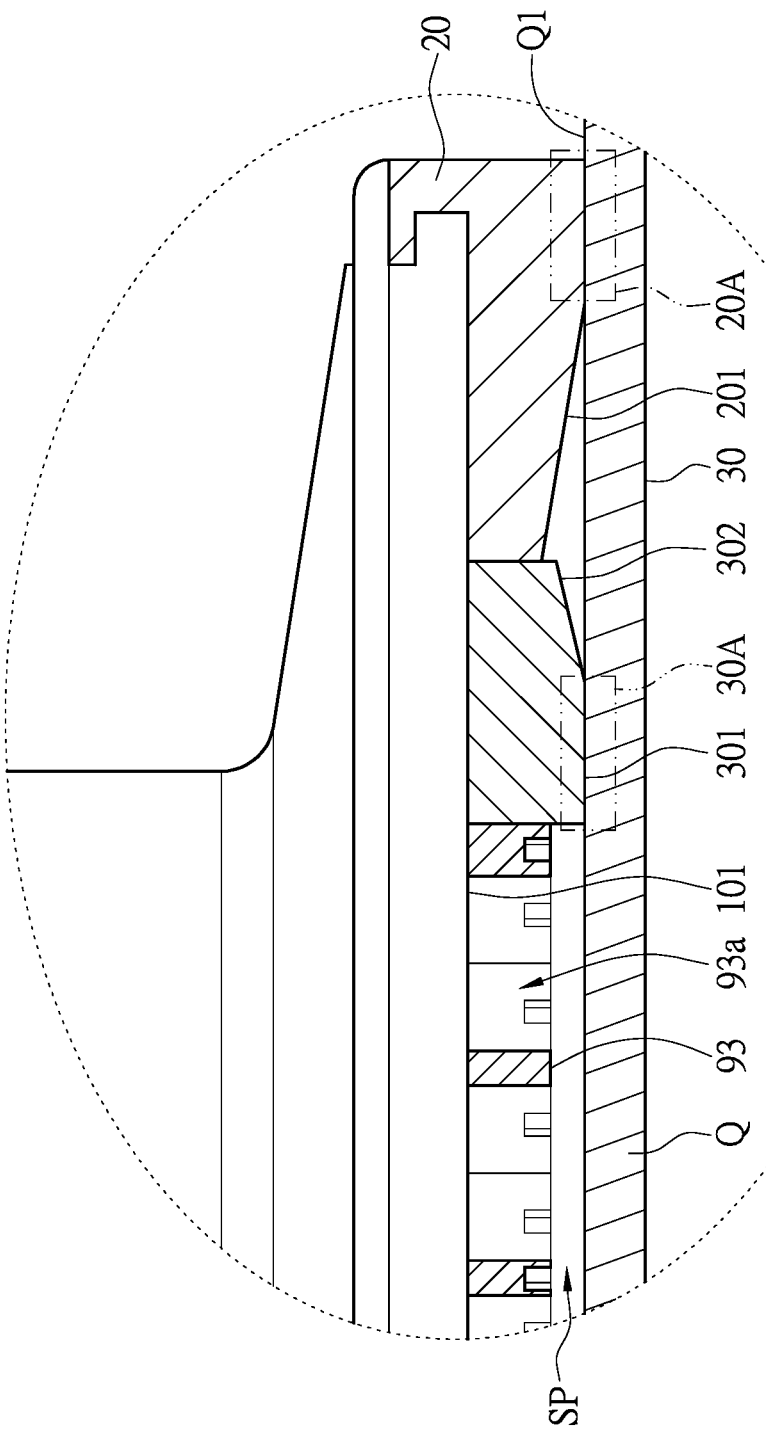
FIG. 9 is a partially enlarged view of FIG. 8.

It is understood that the hardness of the first annular sealing unit 20 is greater than the hardness of the second annular sealing unit 30, and the second annular sealing unit 30 is able to deform when the vacuum pump 50 draws the air inside the sealed space SP to the exterior of the main body 10. When the second annular sealing unit 30 is adhered to the surface Q1 of the member Q and the control unit 40 controls the operation of the vacuum pump 50 to draw the air inside the sealed space SP, the second annular sealing unit 30 deforms with a shape of the surface Q1 of the member Q so as to tightly adhere on the surface Q1 of the member Q. As shown in FIG. 8 and FIG. 9, when the vacuum pump 50 draws the air inside the sealed space SP to the exterior of the main body 10, a portion 20A of the first annular sealing unit 20 is tightly adhered on the surface Q1 of the member Q, such that a first airtightness is formed between the electric vacuum suction lifter 100 and the surface Q1 of the member Q, and a second airtightness is formed between a portion 30A of the second annular sealing unit 30 and the surface Q1 of the member Q. Therefore, airtightness effect between the electric vacuum suction lifter 100 and the member Q is ensured.

It is understood that since the second annular sealing unit 30 is able to deform when the vacuum pump 50 draws the air inside the sealed space SP to the exterior of the main body 10, the electric vacuum suction lifter 100 can be sucked to a rough surface, especially the one that normal suction lifter cannot tightly sucked thereto (e.g., rough-surfaced exterior wall of a building or building stone).

As mentioned above, by virtue of the first annular sealing unit 20 and the second annular sealing unit 30, the electric vacuum suction lifter 100 of the present application has better suction ability (airtightness) and being able to be sucked to different kinds of surfaces of the members compared with the conventional suction lifter. The size of a caliber of the first annular sealing unit 20 and the second annular sealing unit 30 can be customized, and should not be limited thereto.

As shown in FIG. 1, the main body 10 is further configured with two handles 13. The handles 13 can be configured in indifferent angles. In FIG. 8 and FIG. 9, the use carries the member Q via either one of the handles 13. The shape of the handles 13, the amount of the handles 13, and the angle to dispose the handles 13 can be customized, and should not be limited to those shown in figures. In other embodiment, the main body 10 can also be configured with an angular hole 104 for the user to fasten with a buckle. The method of configuring the angular hole 104 on the main body 10 can be customized, and should not be limited to those shown in figures. In another embodiment, the main body 10 can exclude the angular hole 104 and the components for connecting the angular hole 104 and the main body 10 as shown in FIG. 1.

As shown in FIG. 1, FIG. 3, FIG. 4 and FIG. 8, the main body 10 is further configured with a pressure relief button 14. When the pressure relief button 14 is pressed, the control unit 40 enables the air in the exterior of the main body 10 to enter into the sealed space SP through the main body 10, such that the pressure in the sealed space SP will be the same as the pressure in the exterior of the main body 10. Consequently, the electric vacuum suction lifter 100 will no longer be tightly adhered to the surface Q1 of the member Q. In actual practice, the operation of the pressure relief button 14 can be implemented by mechanical means or electrical means so as to enable the air in the exterior of the main body 10 to enter into the sealed space SP through the main body 10.

In the embodiment of applying the mechanical means to enable the air in the exterior of the main body 10 to enter into the sealed space SP through the main body 10, the main body 10 can further include a connecting valve (not shown) and a communicating pipe (not shown). The main body 10 can be configured with an air introducing hole 102, and the suction surface 101 can be configured with a communicating hole 1011. Two ends of the communicating pipe are respectively connected to the air introducing hole 102 and the communicating hole 1011. The connecting valve is disposed in the communicating pipe. The pressure relief button 14 is connected to the connecting valve. The communicating hole 1011 of the suction surface 101 is correspondingly disposed in the second opening 30a of the second annular sealing unit 30. When the pressure relief button 14 is not pressed, the connecting valve correspondingly blocks the communication of the communicating pipe to prevent the air in the exterior of the main body 10 from entering into the sealed space SP through the air introducing hole 102, the communicating pipe and the communicating hole 1011. On the other hands, when the pressure relief button 14 is pressed, the connecting valve no longer blocks the communication of the communicating pipe such that the air in the exterior of the main body 10 can enter into the sealed space SP through the air introducing hole 102, the communicating pipe and the communicating hole 1011.

In the embodiment of applying the electrical means to enable the air in the exterior of the main body 10 to enter into the sealed space SP through the main body 10, the aforesaid connecting valve can be replaced by an electric-controlled valve (not shown). The electric-controlled valve is electrically connected to the control unit 40 and is controlled by the control unit 40 so as to adjust a communication status of the communicating pipe. In this embodiment, when electric-controlled valve is not controlled by the control unit 40, the electric-controlled valve correspondingly blocks the communication of the communicating pipe. On the other hands, when electric-controlled valve is controlled by the control unit 40, the electric-controlled valve no longer blocks the communication of the communicating pipe. The pressure relief button 14 is electrically connected to the control unit 40. When the pressure relief button 14 is pressed, a control signal is correspondingly generated and transmitted to the control unit 40 and the control unit 40 receives the transmitted control signal from the pressure relief button 14. Meanwhile, the control unit 40 controls the operation of the electric-controlled valve to adjust the communication status of the communicating pipe based on the control signal. Therefore, the air in the exterior of the main body 10 can enter into the sealed space SP through the air introducing hole 102, the communicating pipe and the communicating hole 1011.

Figure 6:
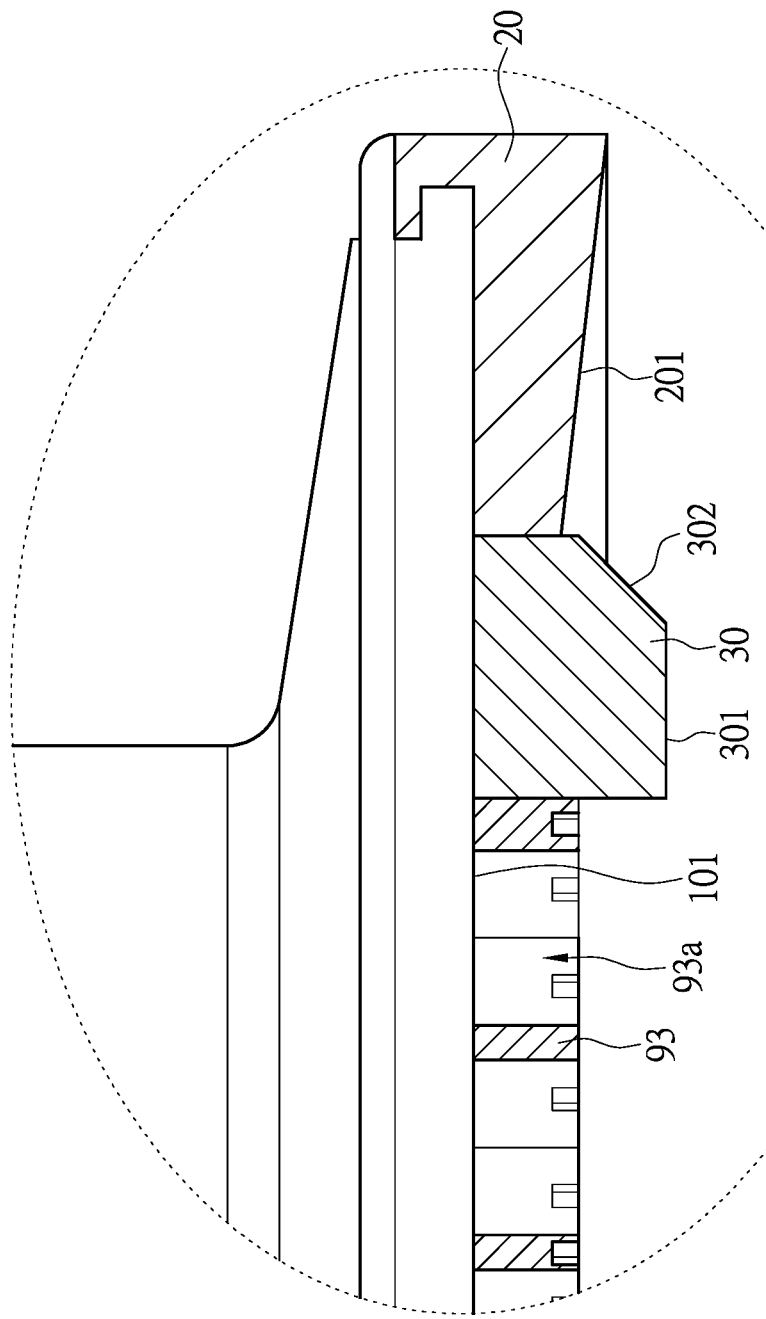
FIG. 6 is a partially enlarged view of FIG. 5.

In actual practice, the first adhering surface 201 is tilted. Specifically, the first adhering surface 201 is tilted from one side that is distal from the second annular sealing unit 30 toward one side that is adjacent to the second annular sealing unit 30. In other words, as shown in FIG. 6, the first adhering surface 201 is tilted from a top-left position towards a bottom-right position of FIG. 6. An outer annular surface 302 of the second annular sealing unit 30 can also be tilted. Specifically, the outer annular surface 302 of the second annular sealing unit 30 is tilted from one side that is adjacent to a second opening 30a (as shown in FIG. 3) of the second annular sealing unit 30 toward one side that is distal from the second opening 30a. In other words, as shown in FIG. 6, the outer annular surface 302 is tilted from a top-right position towards a bottom-left position of FIG. 6. By virtue of the tilted structure of the first adhering surface 201 and the outer annular surface 302, a portion of the first annular sealing unit 20 and a portion of the second annular sealing unit 30 will be accordingly deformed (as shown in FIG. 9) so as to tightly adhere to the surface Q1 of the member Q when the first adhering surface 201 and the second adhering surface 301 is adhered to the surface Q1 of the member Q and meanwhile the vacuum pump 50 draws the air inside the sealed space SP to the exterior of the main body 10. Therefore, a better airtightness effect can be achieved.

Referring to FIG. 8 and FIG. 9, by virtue of the tilted structure of the outer annular surface 302, when the vacuum pump 50 draws the air inside the sealed space SP to the exterior of the main body 10, the second annular sealing unit 30 is more likely to be squeezed and deformed towards the second opening 30a, and the second annular sealing unit 30 is less likely to be squeezed and deformed towards the first annular sealing unit 20. As a result, the second annular sealing unit 30 is difficult to be stacked on the first annular sealing unit 20 after the second annular sealing unit 30 is deformed. Therefore, the airtightness effect of the first annular sealing unit 20 and the second annular sealing unit 30 can be assured.

Figure 4:
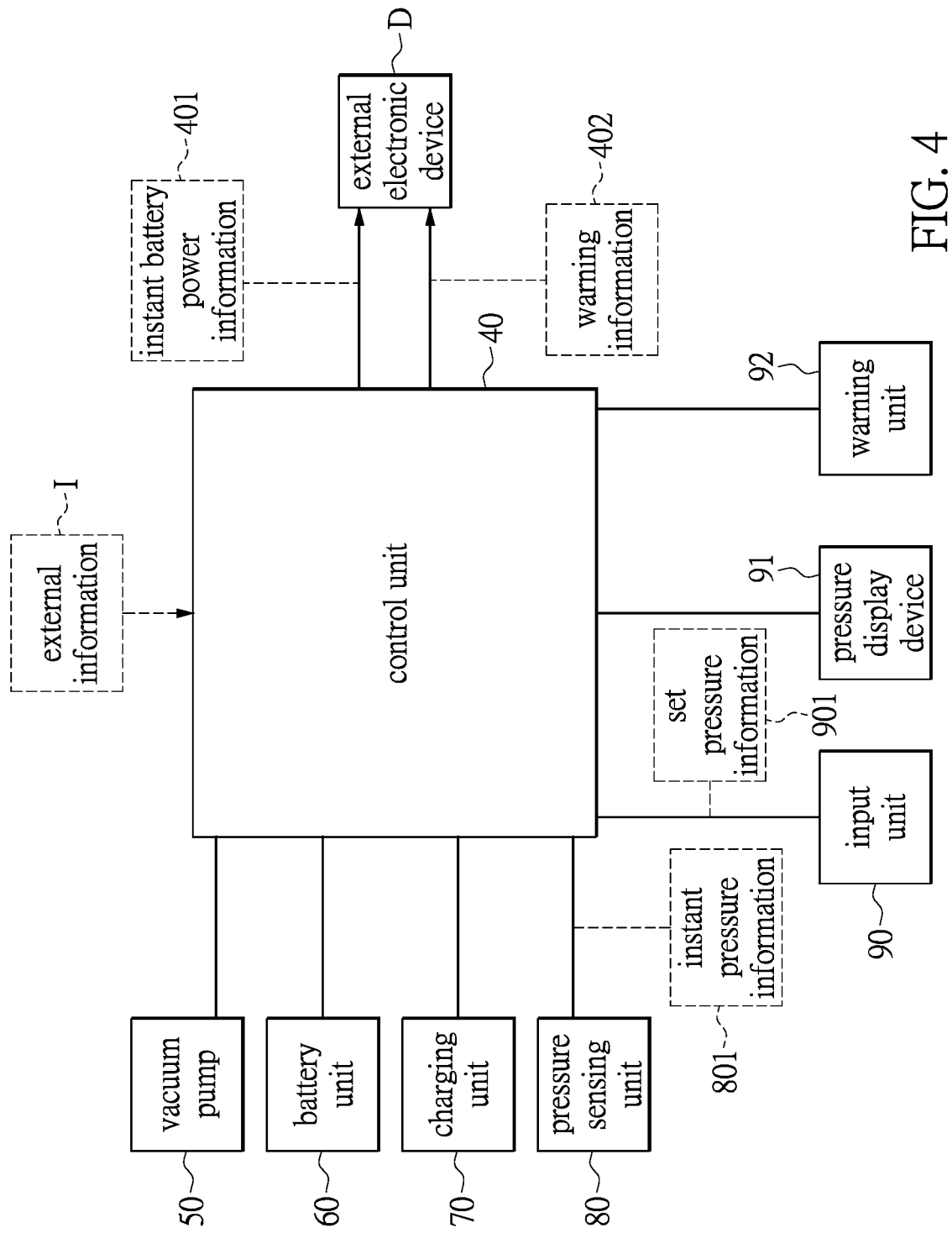
FIG. 4 is a block diagram of the electric vacuum suction lifter according to the present disclosure.
Figure 5:
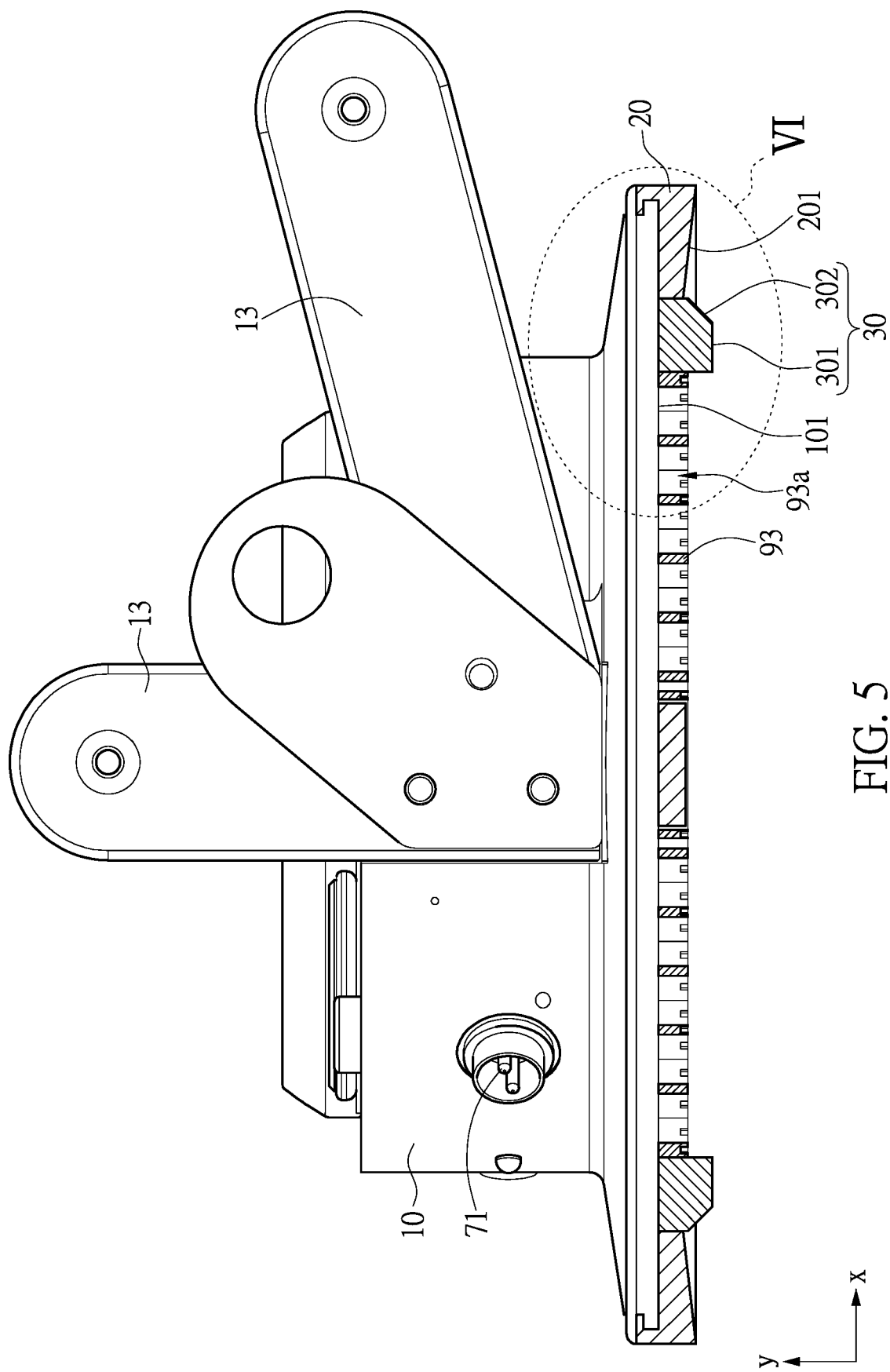
FIG. 5 is a partially cross-sectional view of the electric vacuum suction lifter according to the present disclosure.

As shown in FIG. 4, the control unit 40 is electrically connected to the vacuum pump 50, the battery unit 60, the charging unit 60 and the pressure sensing unit 80. The control unit 40 can be a microprocessor for instance. The battery unit 60 provides electric power for operation of the control unit 40, the vacuum pump 50 and the pressure sensing unit 80. The battery unit 60 can be repeatedly charged and discharged. External power equipment (e.g., supply mains) charges the battery unit 60. In actual practice, the battery unit 60 cooperates with the charging unit 70 to be electrically connected to the external power equipment for charging process, but not limited thereto. The battery unit 60 can be electrically connected to the external power equipment for being independently charged. For example, the battery unit 60 can be removably disposed on the main body 10, and the battery unit 60 which is removed from the main body 10 can be independently charged via the external power equipment. In the embodiment that the battery unit 60 cooperates with the charging unit 70 to be electrically connected to the external power equipment for charging process, charging unit 70 is electrically connected to the battery unit 60 and the external power equipment, such that the external power equipment can charge the battery unit 60 through the charging unit 70. In actual practice, the charging unit 70 can include a charging port 71 (as shown in FIG. 1) and a control circuit. The charging port 71 is exposed to the main body 10 such that the user can charge the battery unit 60 via the charging port 71 and the control circuit through a connection cable. Certainly, the control circuit of the charging unit 70 can include protection design such as an overload protection circuit, a surge protection circuit, and a transformer circuit, but not limited thereto. The required electric power by operation of the control circuit can be provided by the battery unit or other electric power storage unit. In special cases, the charging unit 70 can further includes at least one universal serial bus (USB) charging stand (not shown) that is exposed to the main body 10 such that the user can use the battery unit 60 to charge the external power equipment via the USB charging stand.

The pressure sensing unit 80 is disposed on the main body 10. The pressure sensing unit 80 measures a pressure of the sealed space SP so as to generate instant pressure information 801. When the user press the start button 12, the control unit 40 controls operation of the vacuum pump 50 to draw the air inside the sealed space SP to the exterior of the main body 10. The control unit 40 determines whether the pressure of the sealed space SP is greater than a high predetermined pressure based on the instant pressure information 801. When the control unit 40 determines that the pressure of the sealed space SP is greater than or equal to the high predetermined pressure, the control unit 40 controls the vacuum pump 50 to terminate the operation of the vacuum pump 50.

When the control unit 40 controls the vacuum pump 50 to terminate the operation of the vacuum pump 50, the pressure sensing unit 80 continuously measures the pressure of the sealed space SP, and the control unit 40 continuously determines whether the pressure of the sealed space SP is smaller than a low predetermined pressure based on the instant pressure information 801. When the control unit 40 determines that the pressure of the sealed space SP is smaller than the low predetermined pressure, the control unit 40 controls the operation of the vacuum pump 50. Specifically, the vacuum pump 50 once again draws the air inside the sealed space SP to the exterior of the main body 10 so as to maintain the pressure inside the sealed space SP to be as high as the high predetermined pressure. A negative pressure value corresponding to the high predetermined pressure is greater than a negative pressure value corresponding to the low predetermined pressure.

As mentioned above, the control unit 40 of the electric vacuum suction lifter 100 according to the present application can continuously monitor the suction strength (i.e., the airtightness) of the electric vacuum suction lifter 100 and correspondingly activate the vacuum pump 50 if needed. Therefore, when using the electric vacuum suction lifter 100, the technical personnel do not need to constantly pay attention on the suction strength of the electric vacuum suction lifter 100. Thus, accidence of the technical personnel during operation can be prevented.

In actual practice, the operation of the pressure sensing unit 80 to continuously detect the pressure inside the sealed space SP can be operated all the time or be operated after a predetermined period of time (e.g., a preset seconds or a number of seconds to be set by the user). In the embodiment that the pressure sensing unit 80 is operated after a predetermined period of time to detect the pressure inside the sealed space SP, the predetermined period of time for detecting the pressure can be gradually decreased by the control unit 40 due to the long period of time that the vacuum pump 50 stops to operate. For example, when the control unit 40 controls the vacuum pump 50 to stop drawing the air inside the sealed space SP, the control unit 40 can control the pressure sensing unit 80 to detect the pressure inside the sealed space SP in every 5 minutes. When the vacuum pump 50 stops to operate for ten minutes, the control unit 40 controls the pressure sensing unit 80 to detect the pressure inside the sealed space SP in every 3 minutes.

Referring back to FIG. 4, in different embodiment, the control unit 40 can correspondingly adjust at least one of the high predetermined pressure and the low predetermined pressure based on received external information I. The external information I can be generated by a user via typing on an input unit 90 configured on the main body 10, or be generated and transmitted by an external electronic device D. The means to receive the external information I can be wired or wireless, but should not be limited thereto.

The main body 10 can further configured with a pressure display device 91. The input unit 90 and the pressure display device 91 are electrically connected to the control unit 40. The input unit 90 is operable to generate set pressure information 901. The control unit 40 displays the set pressure information 901 on the pressure display device 91. In other words, the user can watch the pressure display device 91 and operate the input unit 90 to set the high predetermined pressure and/or the low predetermined pressure as mentioned above. The pressure display device 91 displays not only the low predetermined pressure and the high predetermined pressure, but also the instant pressure information 801 when controlled by the control unit 40.

The input unit 90 can be customized as required, and should not be limited. For example, the input unit 90 can include three buttons. Based on the buttons pressed by the user, the control unit 40 can adjust the high predetermined pressure, the low predetermined pressure, or both of them. Specifically, the three buttons of the input unit 90 can respectively correspond to the highest pressure values which the electric vacuum suction lifter 100 requires to adhere to different members Q, for example a glass, an iron plate, and a wall. In other words, the user can directly press the corresponding one of the buttons to select the desired high predetermined pressure based on the different members Q to be adhered to. Certainly, the pressure display device 91 can display the value of the high predetermined pressure for the user to watch when the user presses any one of the buttons. In other embodiment, the input unit 90 can also include numeral buttons. The user can simply type the desired value to set the high predetermined pressure and the low predetermined pressure via the numeral buttons. Certainly, the control unit 40 can determine if the inputted value of the high predetermined pressure by the user is too high, and/or if the inputted value of the low predetermined pressure by the user is too low. If the determination is affirmative, the control unit 40 can ask the user to retype the value (e.g., a warning sound or a warning flash indication).

In other embodiment, the main body 10 can only configured with the pressure display device 91 without the input unit 90. That is, the user can only obtain the instant pressure information of the sealed space SP via the pressure display device 91. However, the user cannot set or adjust the high predetermined pressure and/or the low predetermined pressure via the components on the main body 10. The pressure display device 91 can be in a mechanical pointer form or a digital number form, but not limited thereto.

In yet another embodiment, the control unit 40 can be communicatively connected to the external electronic device D. For example, the communicative connection can be wired (e.g., through a USB cable) or wireless (e.g., via infrared ray or Bluetooth). The external electronic device D can be a computer, a smartphone, or a laptop. The control unit 40 can adjust the high predetermined pressure and/or the low predetermined pressure based on the external information I received from the external electronic device D. In other words, the user can set the value of the high predetermined pressure and/or the low predetermined pressure of the electric vacuum suction lifter 100 via the external electronic device D. Certainly, the control unit 40 can transmit the instant pressure information 801 to the external electronic device D for the user to monitor the suction strength of the electric vacuum suction lifter 100 via the external electronic device D.

It is noted that the main body 10 is further configured with a warning unit 92 that is electrically connected to the control unit 40. The control unit 40 is able to instantly detect a battery power of the battery unit 60. The control unit 40 is able to control the operation of the warning unit 92 to warn the user when the battery power of the battery unit 40 is smaller than a predetermined battery power. When the battery power of the battery unit 60 is smaller than the predetermined battery power and the start button 12 is pressed, the control unit 40 controls the operation of the warning unit 92 and terminates the control of the operation of the vacuum pump 50. Specifically, the control unit 40 obtains the pressure in the sealed space SP based on the instant pressure information 801 measured by the pressure sensing unit 80 so as to determine if the vacuum pump 50 should be reactivated. Accordingly, the control unit 40 will be unable to control the reactivation of the vacuum pump 50 to maintain the pressure in the sealed space SP if the battery power of the battery unit 60 is too low. Consequently, the suction strength between the electric vacuum suction lifter 100 and the member Q may not be enough, thereby incurring accidence of the technical personnel during operation.

Therefore, the control unit 40 of the electric vacuum suction lifter 100 cooperates with the warning unit 92 to warn the user or to restrict the operation of the start button 12 by the user when the battery power of the battery unit 60 is smaller than the predetermined battery power. As a result, the chance of incurring accidence due to the shortage of battery power of the battery unit 60 can be decreased. The warning unit 92 can include a light indication or a speaker. The control unit 40 controls the warning unit 92 to send out the warning information 402 by specific sound indication or flash indication. In other embodiment, the control unit 40 can also send out the warning information 402 by specific sound indication or flash indication based on the instant pressure information 801 so as to inform the user the instant pressure status in the sealed space SP. For example, when the control unit 40 determines that the pressure in the sealed space SP is lower than the low predetermined pressure based on the instant pressure information 801, the control unit 40 can firstly control the operation of the warning unit 92 before controlling the operation of the vacuum pump 50 to inform the user that the vacuum pump 50 is about to operate. Therefore, the user will less likely to be terrified by sudden activation of the vacuum pump 50.

Moreover, the control unit 40 is able to instantly detect the battery power of the battery unit 60 so as to generate instant battery power information 401 and then transmits the instant battery power information 401 to the external electronic device D. The control unit 40 can also transmit the instant pressure information 801 to the external electronic device D. Thus, the user can immediately obtain the battery power of the electric vacuum suction lifter 100 and the pressure in the sealed space SP. When the control unit 40 determines that the pressure of the sealed space SP is smaller than the low predetermined pressure based on the instant pressure information 801, the control unit 40 transmits the warning information 402 to the external electronic device D to warn the user. Similarly, when the control unit 40 determines that the battery power of the battery unit 60 is smaller than the predetermined battery power threshold based on the instant battery power information 401, the control unit 40 transmits the warning information 402 to the external electronic device D to warn the user.

Figure 10:
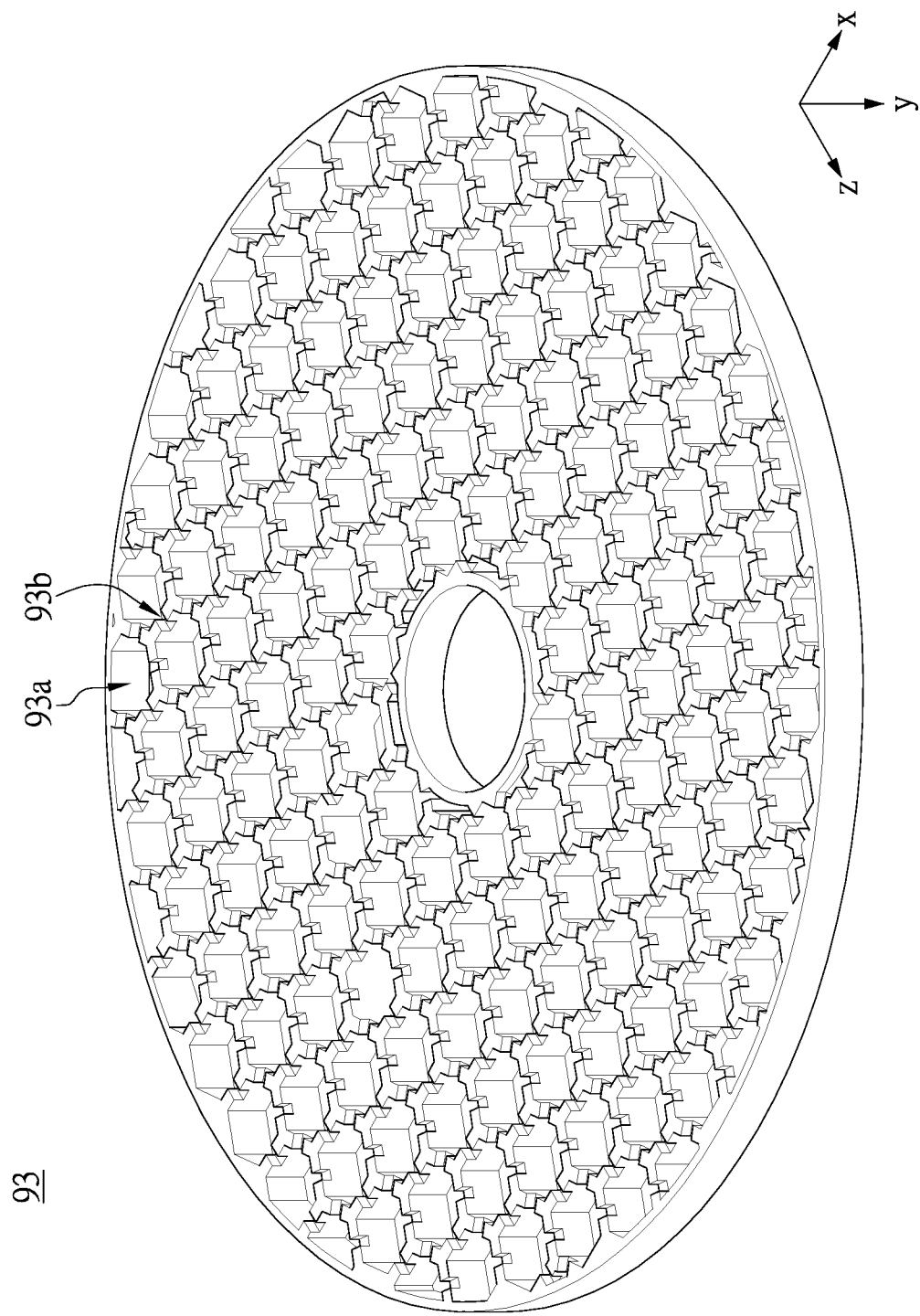
FIG. 10 a schematic view of an abutting unit of the electric vacuum suction lifter according to the present disclosure

Referring back to FIG. 3 and FIG. 6, the suction surface 101 can further be configured with an abutting unit 93. The abutting unit 93 is placed in a second opening 30a of the second annular sealing unit 30. One side of the abutting unit 93 which is distal from the suction surface 101 is defined as an abutting surface 931. A distance between the abutting surface 931 and the suction surface 101 is smaller than a distance between the second adhering surface 301 and the suction surface 101. The abutting unit 93 is formed with a plurality of through holes 93a, at least a part of the through holes 93a are in spatial communication with one another, and at least one of the through holes 93a spatially communicated with one another are in spatial communication with the air drawing hole 1012 formed on the suction surface 101. The vacuum pump 50 draws the air inside the sealed space SP (as shown in FIG. 9) to the exterior of the main body 10 through the air drawing holes 1012. In actual practice, the way that the through holes 93a are in spatial communication with one another can be customized as required. For example, one side of the abutting unit 93 which is opposite to the abutting surface 931 can be formed with a plurality of concaved grooves 93b, as shown in FIG. 7 and FIG. 10. When the abutting unit 93 is disposed in the suction surface 101, the plurality of concaved grooves 93b may enable at least a part of the through holes 93a to be in spatial communication with one another. The side wall forming the through holes 93a can be formed with through apertures thereon such that the plurality of the through holes 93a can be in spatial communication with one another.

By virtue of the abutting unit 93, when the user presses the start button 12 and the vacuum pump 50 is controlled by the control unit 40 to operate, a portion of the adhering surface 201 and a portion of the second adhering surface 301 will be tightly adhere to the surface Q1 of the member Q. At this time, the member Q may be slightly deformed if a thickness of the member Q is relatively thick. As a result, the abutting unit 93 is able to abut against the slightly deformed member Q to prevent the member Q from being further deformed. That is to say, when the vacuum pump 50 is in operation, the abutting unit 93 can prevent the member Q from being further deformed due to the negative pressure of the sealed space SP. In other words, by virtue of the abutting unit 93 of the present application, the electric vacuum suction lifter 100 can be adhered to the member having a relatively thin thickness. Moreover, the member Q will not be largely deformed when being adhered by the electric vacuum suction lifter 100. In is understood that the abutting unit 93 may not abut against the surface Q1 of the member Q depends on the deformation of the different members Q. Certainly, the thickness of the abutting unit 93 can be adjusted to ensure that the abutting unit 93 to abut against the surface Q1 of the member Q when the electric vacuum suction lifter 100 is adhered to the member Q.

Furthermore, by virtue of the through holes 93a and the concaved grooves 93b, each portion of the member Q can evenly endure the vacuum adhering strength when the vacuum pump 50 is in operation. Thus, the problem that a specific portion of the member Q is deformed a lot compared with the other portions of the member Q can be prevented. The thickness of the abutting unit 93, the shape of the abutting unit 93, the amount of the through holes 93a, and the shape of the through holes 93a can be customized if needed, and should not be limited herein.

Figure 11:
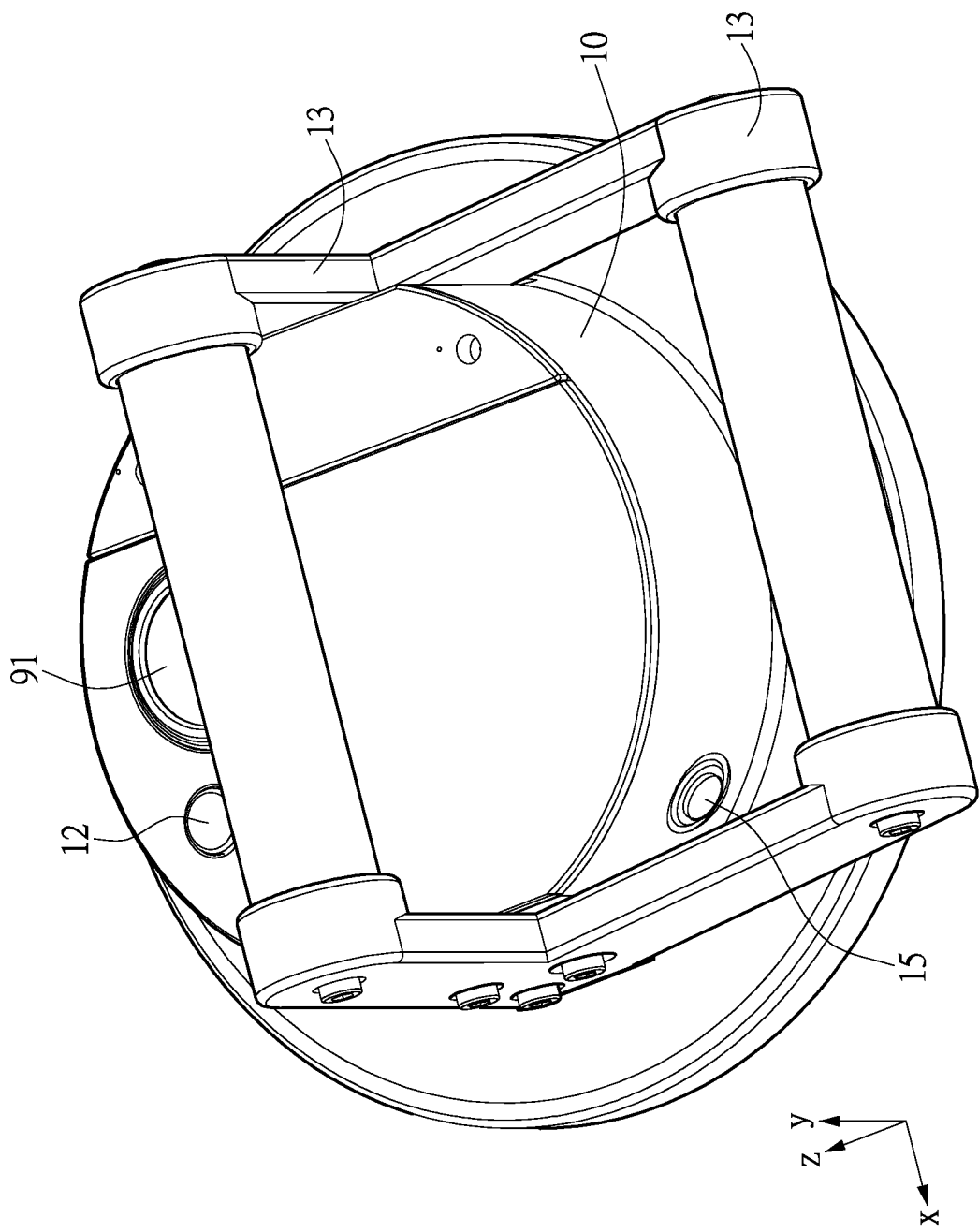
FIG. 11 is a schematic view of a second embodiment of the electric vacuum suction lifter according to the present disclosure.
Figure 12:
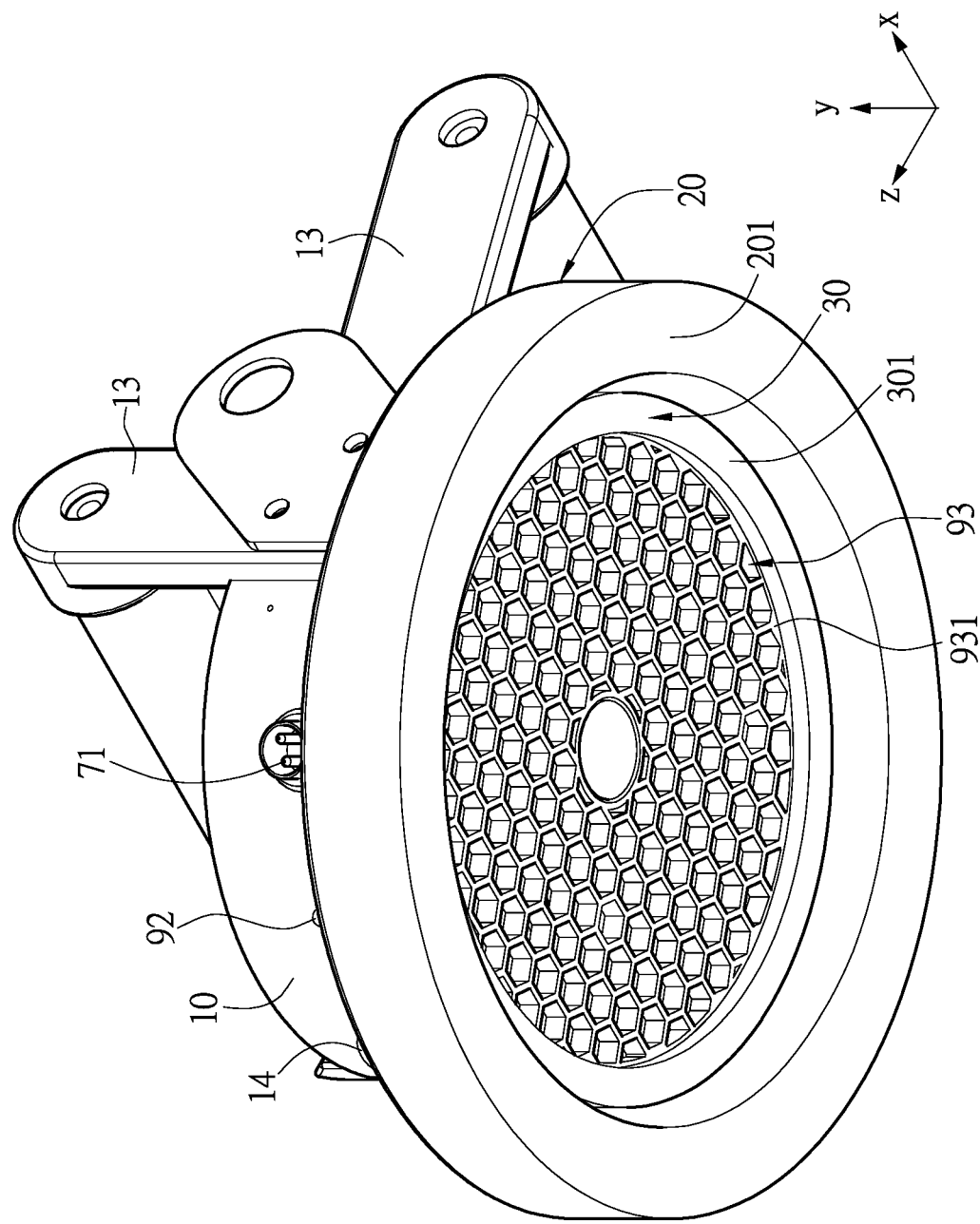
FIG. 12 is a schematic view of a third embodiment of the electric vacuum suction lifter according to the present disclosure.
Figure 13:
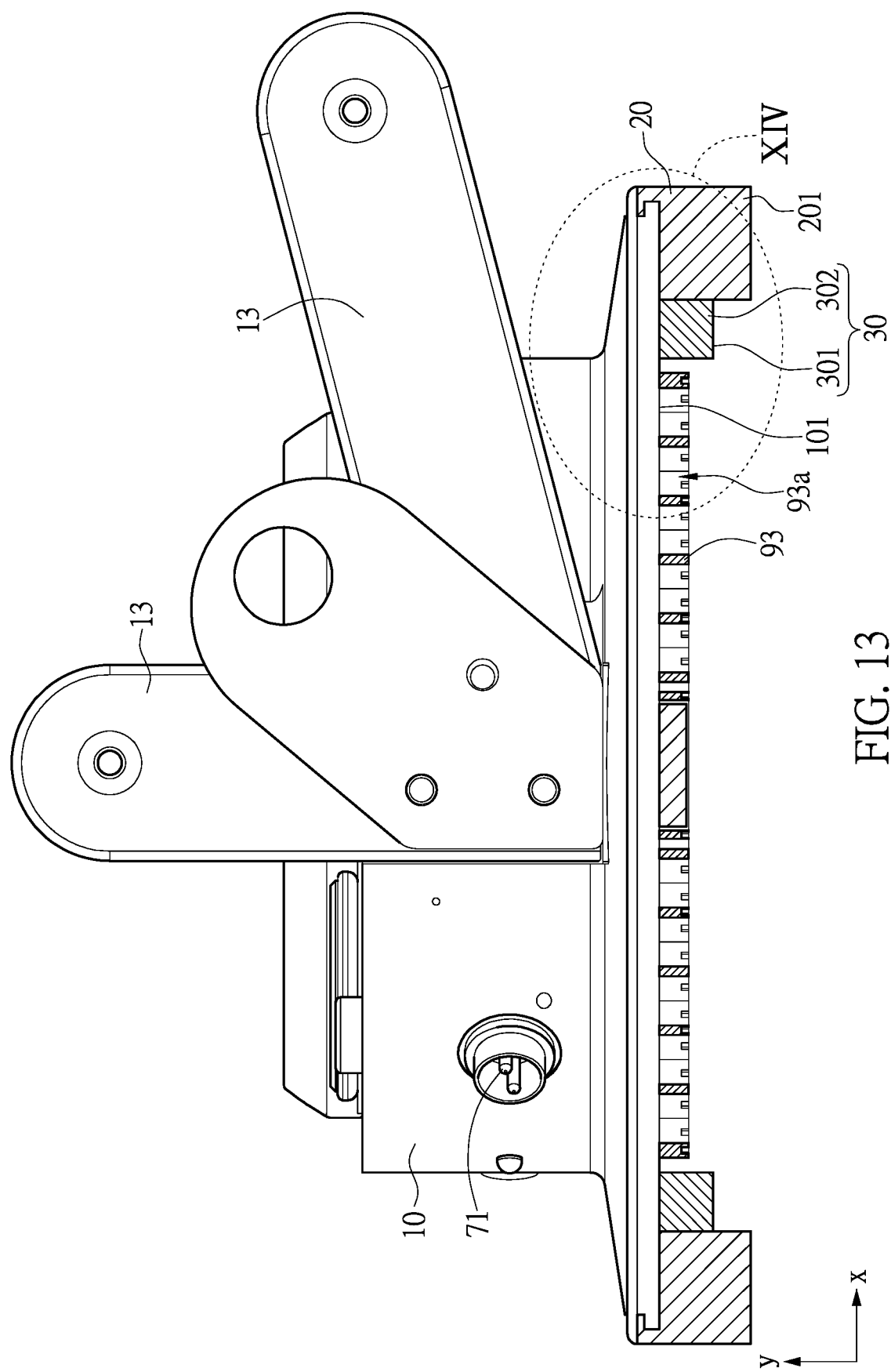
FIG. 13 is a partially cross-sectional view of the third embodiment of the electric vacuum suction lifter according to the present disclosure.
Figure 14:
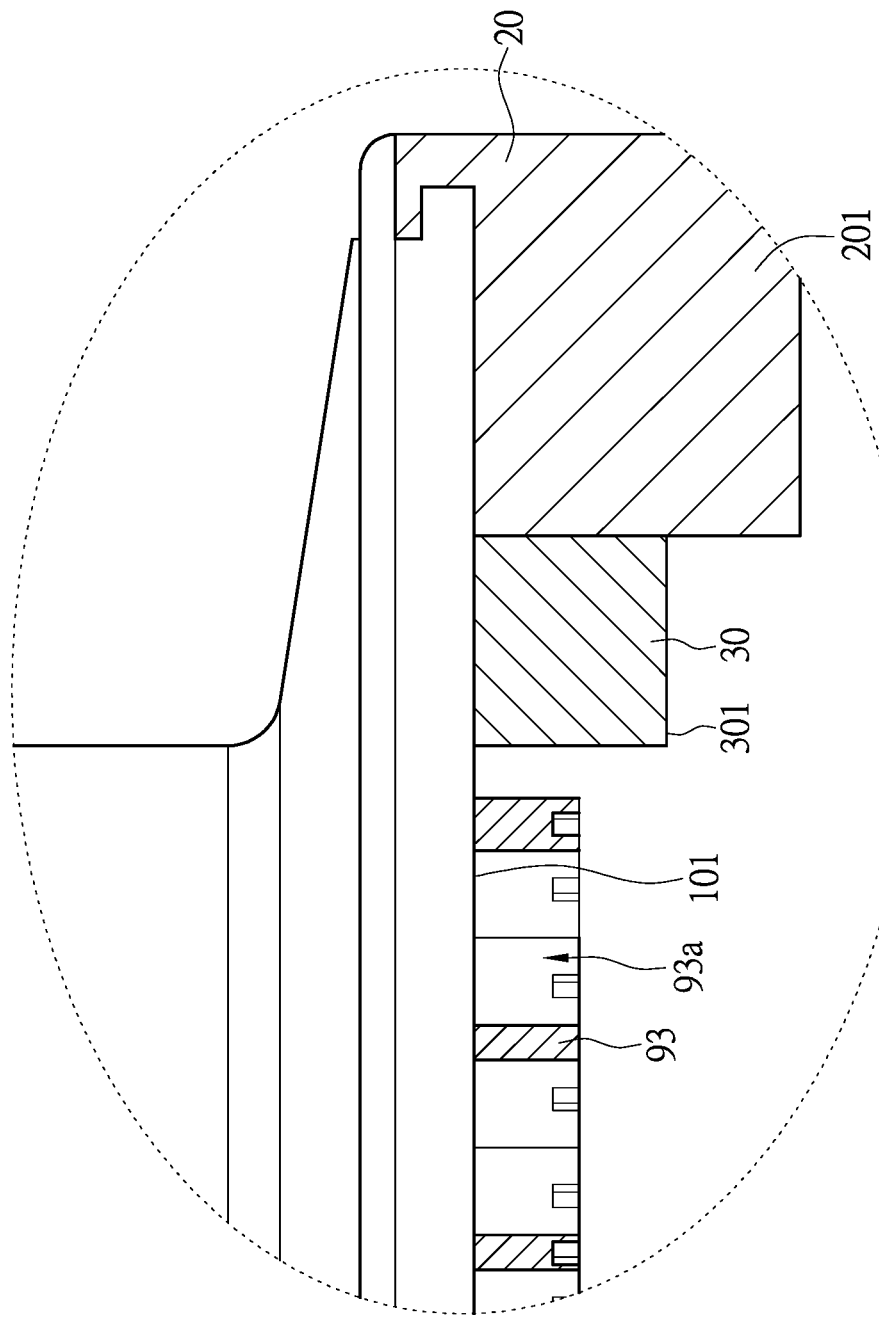
FIG. 14 is a partially enlarged view of FIG. 13.
Figure 15:
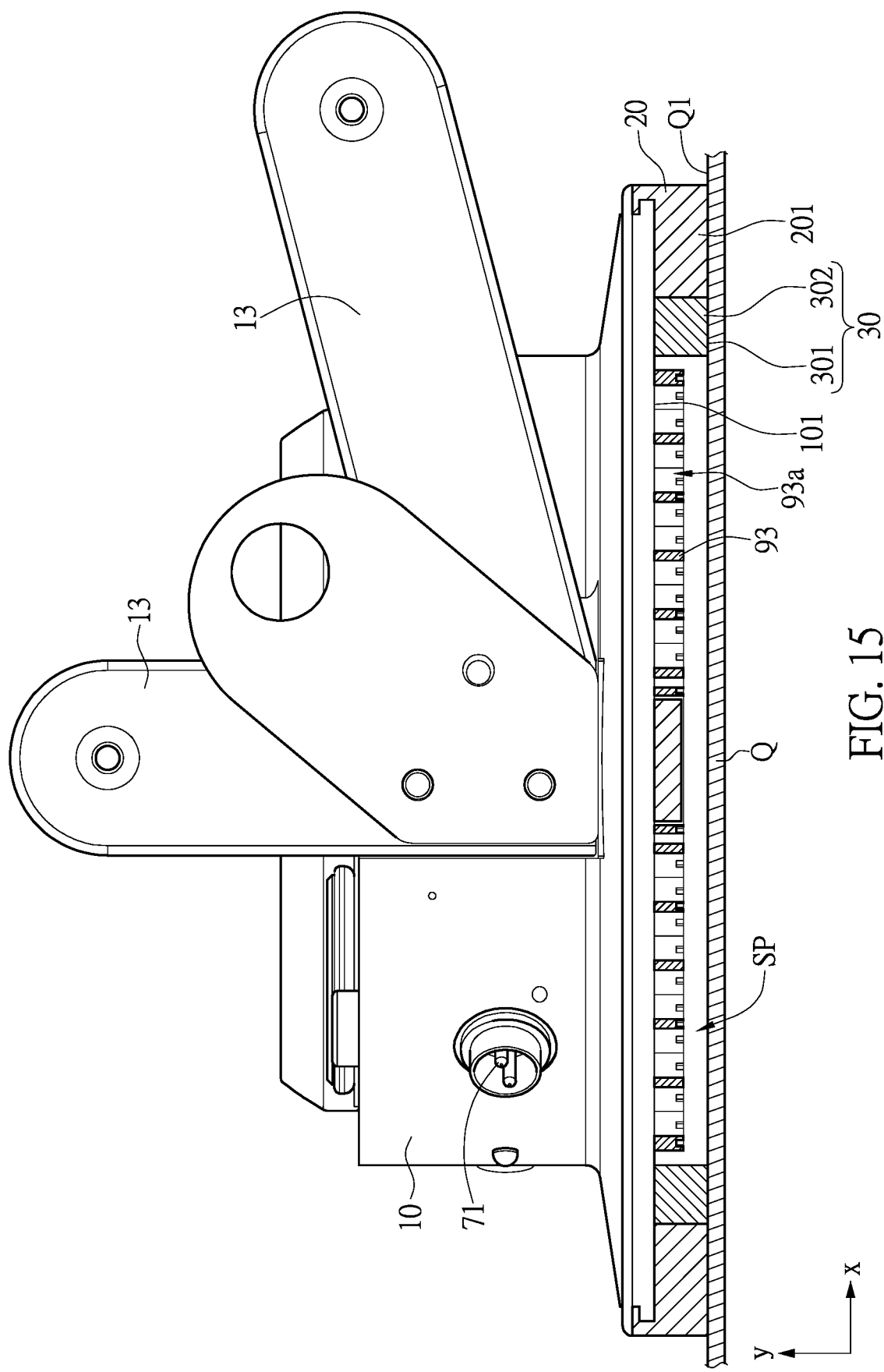
FIG. 15 is a schematic view of the third embodiment of the electric vacuum suction lifter sucked on the member according to the present disclosure.

Referring to FIG. 11, a schematic view of a second embodiment of the electric vacuum suction lifter according to the present disclosure is shown. The major difference between this embodiment and the abovementioned embodiment resides in that the main body 10 can be further configured with a switch button 15. Since the other components of this embodiment are the same as those of the abovementioned embodiment, the detailed description will thus be omitted.

Referring to FIG. 1, FIG. 4 and FIG. 11, the switch button 15 is electrically connected to the control unit 40. The control unit 40 is able to detect the battery power of the battery unit 60 and to control the warning unit 92 based on the battery power of the battery unit 60 when the switch button 15 is pressed by the user. Moreover, the user can obtain the battery power of the battery unit 60 and determine that whether the electric vacuum suction lifter 100 has enough battery power to operate the adhering process.

Specifically, when the control unit 40 is driven by the switch button 15 to determine that the battery power of the battery unit 60 is smaller than a predetermined battery power threshold, the control unit 40 controls the warning unit 92 to send out the warning information 402 by specific sound indication or flash indication so as to inform the user that the electric vacuum suction lifter 100 has insufficient battery power to operate the adhering process. Meanwhile, the control unit 40 can control the start button 12 and the vacuum pump 50 to terminate the operation of the start button 12 and the vacuum pump 50. Even though the user presses the start button 12, the vacuum pump 50 will not be activated.

In other embodiment, the warning unit 92 can include a display monitor. When the control unit 40 determines that the battery power of the battery unit 60 is insufficient, the control unit 40 controls the display monitor to display specific words or symbols so as to inform the user that the electric vacuum suction lifter 100 has insufficient battery power to operate the adhering process.

Referring further to FIG. 12 to FIG. 15, FIG. 12 is a schematic view of a third embodiment of the electric vacuum suction lifter according to the present disclosure. The major difference between this embodiment and the abovementioned embodiment resides in that one side of the second annular sealing unit 30 which is distal from the suction surface 101 is defined as a second adhering surface 301, a distance between the second adhering surface 301 and the suction surface 101 is smaller than a distance between the first adhering surface 201 and the suction surface 101, and the first annular sealing unit 20, the suction surface 101 and the surface Q1 together form the sealed space SP when the first adhering surface 201 of the first annular sealing unit 20 is adhered to the surface Q1 of the member Q. A hardness of the second annular sealing unit 30 is greater than a hardness of the first annular sealing unit 20. When the control unit 40 controls the operation of the vacuum pump 50 to draw the air inside the sealed space SP, the first annular sealing unit 20 deforms with a shape of the surface Q1 to tightly adhere on the surface Q1.

Moreover, the suction surface 101 can further be configured with an abutting unit 93. The abutting unit 93 is placed in a second opening 30a of the second annular sealing unit 30. One side of the abutting unit 93 which is distal from the suction surface 101 is defined as an abutting surface 931. A distance between the abutting surface 931 and the suction surface 101 is smaller than a distance between the first adhering surface 201 and the suction surface 101.

Since the other components of this embodiment are the same as those of the abovementioned embodiment, the detailed description will thus be omitted for sake of brevity.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electric vacuum suction lifter, operable to be sucked on a surface, the electric vacuum suction lifter comprising:
    a main body, having a suction surface in one side of the main body, wherein the suction surface is configured with a first annular sealing unit and a second annular sealing unit thereon, one side of the first annular sealing unit which is distal from the suction surface is defined as a first adhering surface, the second annular sealing unit is disposed in a first opening of the first annular sealing unit, one side of the second annular sealing unit which is distal from the suction surface is defined as a second adhering surface, a distance between the second adhering surface and the suction surface is greater than a distance between the first adhering surface and the suction surface, and the second annular sealing unit, the suction surface and the surface together form a sealed space when the second adhering surface of the second annular sealing unit is adhered to the surface;
    a control unit disposed on the main body;
    a vacuum pump disposed on the main body, wherein: the vacuum pump is electrically connected to the control unit, and the vacuum pump is controlled by the control unit to draw the air inside the sealed space to the exterior of the main body;
    a pressure sensing unit disposed on the main body, wherein the pressure sensing unit measures a pressure of the sealed space to generate instant pressure information;

a battery unit disposed on the main body, wherein the battery unit is electrically connected to the control unit, and the battery unit provides electric power for operation of the control unit, the vacuum pump and the pressure sensing unit, and wherein an external power equipment charges the battery unit;

a start button disposed on the main body, wherein: the start button is electrically connected to the control unit, and the control unit controls operation of the vacuum pump when the start button is pressed; and a pressure relief button disposed on the main body, wherein the air drawn to the exterior of the main body enters into the sealed space through the main body when the pressure relief button is pressed, wherein the delivery of the instant pressure information generated by the pressure sensing unit to the control unit for comparison of high predetermined pressure and low predetermined pressure;

wherein when the second adhering surface is adhered to the surface and the control unit controls the operation of the vacuum pump to draw the air inside the sealed space to the exterior of the main body, the control unit determines whether the pressure of the sealed space is greater than the high predetermined pressure based on the instant pressure information, when the control unit determines that the pressure of the sealed space is greater than or equal to the high predetermined pressure, the control unit controls the vacuum pump to terminate the operation of the vacuum pump, wherein when the control unit controls the vacuum pump to terminate the operation of the vacuum pump, the pressure sensing unit continuously measures the pressure of the sealed space, and the control unit continuously determines whether the pressure of the sealed space is smaller than the low predetermined pressure based on the instant pressure information, when the control unit determines that the pressure of the sealed space is smaller than the low predetermined pressure, the control unit controls the operation of the vacuum pump, wherein a negative pressure value corresponding to the high predetermined pressure is greater than a negative pressure value corresponding to the low predetermined pressure.

2. The electric vacuum suction lifter according to claim 1, wherein a hardness of the first annular sealing unit is greater than a hardness of the second annular sealing unit, when the second annular sealing unit is adhered to the surface and the control unit controls the operation of the vacuum pump to draw the air inside the sealed space, the second annular sealing unit deforms with a shape of the surface to tightly adhere on the surface, the main body is further configured with at least one handle, and, when the electric vacuum suction lifter is sucked on the surface of a member, the member can be carried via the handle.

3. The electric vacuum suction lifter according to claim 1, wherein the suction surface is further configured with an abutting unit, the abutting unit is placed in a second opening of the second annular sealing unit, one side of the abutting unit which is distal from the suction surface is defined as an abutting surface, and a distance between the abutting surface and the suction surface is smaller than a distance between the second adhering surface and the suction surface.

4. The electric vacuum suction lifter according to claim 3, wherein the suction surface is formed with an air drawing hole, the vacuum pump draws the air inside the sealed space to the exterior of the main body via the air drawing hole, the abutting unit is formed with a plurality of through holes, at least a part of the through holes are in spatial communication with one another, and at least one of the through holes spatially communicated with one another are in spatial communication with the air drawing hole.

5. The electric vacuum suction lifter according to claim 1, wherein the control unit is able to receive external information to correspondingly adjust the high predetermined pressure, the control unit is able to receive the external information to correspondingly adjust the low predetermined pressure, the external information is generated by a user operation of an input unit of the main body or to be transmitted by an external electronic device.

6. The electric vacuum suction lifter according to claim 5, wherein the main body is further configured with a pressure display device, the pressure display device displays the instant pressure information, the input unit and the pressure display device are electrically connected to the control unit, the input unit is operable to generate set pressure information, the control unit is able to display the set pressure information on the pressure display device, and the control unit is able to control the pressure display device to display the instant pressure information.

7. The electric vacuum suction lifter according to claim 1, wherein the main body further includes an input unit being configured with a plurality of buttons and being able to adjust the high predetermined pressure when corresponding ones of the plurality of buttons are pressed, and the input unit is able to adjust the low predetermined pressure when corresponding ones of the plurality of buttons are pressed.

8. The electric vacuum suction lifter according to claim 1, wherein the first adhering surface is tilted, the first adhering surface is tilted from one side that is distal from the second annular sealing unit toward one side that is adjacent to the second annular sealing unit, an outer annular surface of the second annular sealing unit is tilted, the outer annular surface is tilted from one side that is adjacent to a second opening of the second annular sealing unit toward one side that is distal from the second opening.

9. The electric vacuum suction lifter according to claim 1, wherein the main body is further configured with a warning unit that is electrically connected to the control unit, the control unit is able to instantly detect a battery power of the battery unit, the control unit is able to control the operation of the warning unit to warn a user when the battery power of the battery unit is smaller than a predetermined battery power, when the battery power of the battery unit is smaller than the predetermined battery power and the start button is pressed, the control unit controls the operation of the warning unit and terminates the control of the operation of the vacuum pump.

10. The electric vacuum suction lifter according to claim 1, wherein the control unit is communicatively connected to an external electronic device, the control unit is able to instantly detect a battery power of the battery unit to generate instant battery power information, the control unit transmits the instant pressure information and the instant battery power information to the external electronic device, when the control unit determines that the pressure of the sealed space is smaller than the low predetermined pressure based on the instant pressure information, the control unit transmits warning information to the external electronic device, when the control unit determines that the battery power of the battery unit is smaller than a predetermined battery power threshold based on the instant battery power information, the control unit transmits warning information to the external electronic device.

11. The electric vacuum suction lifter according to claim 1, wherein the main body is further configured with a switch button that is electrically connected to the control unit, the control unit is able to be driven to detect a battery power of the battery unit when the switch button is pressed, when the control unit is driven by the switch button to determine that the battery power of the battery unit is smaller than a predetermined battery power threshold and the start button is pressed, the control unit controls the vacuum pump to terminate an air drawing operation.

12. An electric vacuum suction lifter, operable to be sucked on a surface, the electric vacuum suction lifter comprising:
a main body, having a suction surface in one side of the main body, wherein the suction surface is configured with a first annular sealing unit and a second annular sealing unit thereon, one side of the first annular sealing unit which is distal from the suction surface is defined as a first adhering surface, the second annular sealing unit is disposed in a first opening of the first annular sealing unit, one side of the second annular sealing unit which is distal from the suction surface is defined as a second adhering surface, a distance between the second adhering surface and the suction surface is smaller than a distance between the first adhering surface and the suction surface, and the first annular sealing unit, the suction surface and the surface together form a sealed space when the first adhering surface of the first annular sealing unit is adhered to the surface;
a control unit disposed on the main body;
a vacuum pump disposed on the main body, wherein the vacuum pump is electrically connected to the control unit, the vacuum pump is controlled by the control unit to draw the air inside the sealed space to the exterior of the main body;
a pressure sensing unit disposed on the main body, wherein the pressure sensing unit measures a pressure of the sealed space to generate instant pressure information;
a battery unit disposed on the main body, wherein the battery unit is electrically connected to the control unit, the battery unit provides electric power for operation of the control unit, the vacuum pump and the pressure sensing unit, and wherein an external power equipment charges the battery unit;
a start button disposed on the main body, wherein the start button is electrically connected to the control unit, and the control unit controls operation of the vacuum pump when the start button is pressed; and
a pressure relief button disposed on the main body, wherein the air drawn to the exterior of the main body enters into the sealed space through the main body when the pressure relief button is pressed,
wherein the delivery of the instant pressure information generated by the pressure sensing unit to the control unit for comparison of high predetermined pressure and low predetermined pressure;
wherein when the first adhering surface is adhered to the surface and the control unit controls the operation of the vacuum pump to draw the air inside the sealed space to the exterior of the main body, the control unit determines whether the pressure of the sealed space is greater than the high predetermined pressure based on the instant pressure information, when the control unit determines that the pressure of the sealed space is greater than or equal to the high predetermined pressure, the control unit controls the vacuum pump to terminate the operation of the vacuum pump,
wherein when the control unit controls the vacuum pump to terminate the operation of the vacuum pump, the pressure sensing unit continuously measures the pressure of the sealed space, and the control unit continuously determines whether the pressure of the sealed space is smaller than the low predetermined pressure based on the instant pressure information, when the control unit determines that the pressure of the sealed space is smaller than the low predetermined pressure, the control unit controls the operation of the vacuum pump, wherein a negative pressure value corresponding to the high predetermined pressure is greater than a negative pressure value corresponding to the low predetermined pressure.

13. The electric vacuum suction lifter according to claim 12, wherein a hardness of the second annular sealing unit is greater than a hardness of the first annular sealing unit, when the first annular sealing unit is adhered to the surface and the control unit controls the operation of the vacuum pump to draw the air inside the sealed space, the first annular sealing unit deforms with a shape of the surface to tightly adhere on the surface, the main body is further configured with at least one handle, and, when the electric vacuum suction lifter is sucked on the surface of a member, the member can be carried via the handle.

14. The electric vacuum suction lifter according to claim 12, wherein the suction surface is further configured with an abutting unit, the abutting unit is placed in a second opening of the second annular sealing unit, one side of the abutting unit which is distal from the suction surface is defined as a abutting surface, and a distance between the abutting surface and the suction surface is smaller than a distance between the first adhering surface and the suction surface.

15. The electric vacuum suction lifter according to claim 14, wherein the suction surface is formed with an air drawing hole, the vacuum pump draws the air inside the sealed space to the exterior of the main body via the air drawing hole, the abutting unit is formed with a plurality of through holes, at least a part of the through holes are in spatial communication with one another, and at least one of the through holes spatially communicated with one another are in spatial communication with the air drawing hole.

16. The electric vacuum suction lifter according to claim 12, wherein the control unit is able to receive external information to correspondingly adjust the high predetermined pressure, the control unit is able to receive the external information to correspondingly adjust the low predetermined pressure, the external information is generated by a user operation of an input unit of the main body or to be transmitted by an external electronic device.

17. The electric vacuum suction lifter according to claim 16, wherein the main body is further configured with a pressure display device, the pressure display device displays the instant pressure information, the input unit and the pressure display device are electrically connected to the control unit, the input unit is operable to generate set pressure information, the control unit is able to display the set pressure information on the pressure display device, and the control unit is able to control the pressure display device to display the instant pressure information.

18. The electric vacuum suction lifter according to claim 12, wherein the main body further includes an input unit, the input unit is configured with a plurality of buttons, the input unit is able to adjust the high predetermined pressure when corresponding ones of the plurality of buttons are pressed, and the input unit is able to adjust the low predetermined pressure when corresponding ones of the plurality of buttons are pressed.

19. The electric vacuum suction lifter according to claim 12, wherein the main body is further configured with a warning unit that is electrically connected to the control unit, the control unit is able to instantly detect a battery power of the battery unit, the control unit is able to control the operation of the warning unit to warn a user when the battery power of the battery unit is smaller than a predetermined battery power, when the battery power of the battery unit is smaller than the predetermined battery power and the start button is pressed, the control unit controls the operation of the warning unit and terminates the control of the operation of the vacuum pump.

20. The electric vacuum suction lifter according to claim 12, wherein the control unit is communicatively connected to an external electronic device, the control unit is able to instantly detect a battery power of the battery unit to generate instant battery power information, the control unit transmits the instant pressure information and the instant battery power information to the external electronic device, when the control unit determines that the pressure of the sealed space is smaller than the low predetermined pressure based on the instant pressure information, the control unit transmits warning information to the external electronic device, when the control unit determines that the battery power of the battery unit is smaller than a predetermined battery power threshold based on the instant battery power information, the control unit transmits warning information to the external electronic device.

21. The electric vacuum suction lifter according to claim 12, wherein the main body is further configured with a switch button that is electrically connected to the control unit, the control unit is able to be driven to detect a battery power of the battery unit when the switch button is pressed, when the control unit is driven by the switch button to determine that the battery power of the battery unit is smaller than a predetermined battery power threshold and the start button is pressed, the control unit controls the vacuum pump to terminate an air drawing operation.

* * * * *